US011972737B2

(12) United States Patent
Park et al.

(10) Patent No.: US 11,972,737 B2
(45) Date of Patent: Apr. 30, 2024

(54) DISPLAY DEVICE, METHOD OF DRIVING THE SAME, AND ELECTRONIC APPARATUS INCLUDING THE SAME

(71) Applicant: Samsung Display Co., Ltd., Yongin-Si (KR)

(72) Inventors: Heesook Park, Suwon-si (KR); Daye Moon, Seoul (KR); Kyoungho Lim, Hwaseong-si (KR); Seulki Son, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/118,096

(22) Filed: Mar. 6, 2023

(65) Prior Publication Data

US 2024/0046886 A1 Feb. 8, 2024

(30) Foreign Application Priority Data

Jul. 29, 2022 (KR) ........................ 10-2022-0094527

(51) Int. Cl.

*G09G 3/3241* (2016.01)
*G09G 3/3283* (2016.01)
*G09G 3/3291* (2016.01)

(52) U.S. Cl.

CPC ... *G09G 3/3291* (2013.01); *G09G 2320/0233* (2013.01); *G09G 2320/0626* (2013.01)

(58) Field of Classification Search

CPC ... G09G 2320/0233; G09G 2320/0626; G09G 3/3291

See application file for complete search history.

(56) References Cited

U.S. PATENT DOCUMENTS

2020/0372861 A1* 11/2020 Ok ........................ G09G 3/3233

FOREIGN PATENT DOCUMENTS

KR 10-2194775 B1 12/2020

* cited by examiner

*Primary Examiner* — Deeprose Subedi
(74) *Attorney, Agent, or Firm* — Innovation Counsel LLP

(57) ABSTRACT

A display device includes a display panel which includes a compensation area, an image processing device, a timing controller which includes an average luminance decrease rate calculator which calculates an average luminance decrease rate, a luminance decrease rate calculator which calculates a luminance decrease rate for the compensation area, and a data compensator which generates output image data by applying the luminance decrease rate for the compensation area to the input image data, and a data driver which provides data voltages generated based on the output image data to the display panel.

20 Claims, 13 Drawing Sheets

FIG. 6

| | REFERENCE LUMINANCE DECREASE RATE | AVERAGE LUMINANCE DECREASE RATE | LUMINANCE DECREASE RATE (CASE1) | LUMINANCE DECREASE RATE (CASE2) | LUMINANCE DECREASE RATE (CASE3) | LUMINANCE DECREASE RATE (CASE4) |
|---|---|---|---|---|---|---|
| FIRST LOGO AREA | 30% | 13% | 0% | 15% | 26% | 30% |
| SECOND LOGO AREA | 40% | 7% | 0% | 15% | 37% | 40% |
| BANNER AREA | 20% | 6% | 0% | 15% | 18% | 20% |

FIG. 12

| | REFERENCE AREA LUMINANCE DECREASE RATE | LUMINANCE DECREASE RATE | AREA LUMINANCE DECREASE RATE (CASE1) | AREA LUMINANCE DECREASE RATE (CASE2) | AREA LUMINANCE DECREASE RATE (CASE3) | AREA LUMINANCE DECREASE RATE (CASE4) |
|---|---|---|---|---|---|---|
| FIRST LUMINANCE CONTROL AREA | 25% | 30% | 0% | 15% | 17% | 25% |
| SECOND LUMINANCE CONTROL AREA | 28% | 0% | 0% | 15% | 28% | 28% |
| THIRD LUMINANCE CONTROL AREA | 25% | 30% | 0% | 15% | 17% | 25% |
| FOURTH LUMINANCE CONTROL AREA | 32% | 0% | 0% | 15% | 32% | 32% |
| FIFTH LUMINANCE CONTROL AREA | 25% | 20% | 0% | 15% | 20% | 25% |
| SIXTH LUMINANCE CONTROL AREA | 25% | 20% | 0% | 15% | 20% | 25% |

DISPLAY DEVICE, METHOD OF DRIVING THE SAME, AND ELECTRONIC APPARATUS INCLUDING THE SAME

CROSS-REFERENCE TO RELATED APPLICATION(S)

This application claims priority under 35 USC § 119 to Korean Patent Application No. 10-2022-0094527 filed on Jul. 29, 2022, in the Korean Intellectual Property Office (KIPO), the entire disclosure of which is incorporated by reference herein.

BACKGROUND

1. Field

Embodiments relate to a display device. More particularly, embodiments relate to a display device displaying a fixed image (e.g., a logo or banner) in a display area, a method of driving the display device, and an electronic apparatus including the display device.

2. Description of the Related Art

An electronic apparatus may include a display device and an image processing device. The image processing device may generate input image data based on original image data received from an image source, and may provide the input image data to the display device. The display device may generate output image data based on the input image data, and may display an image based on the output image data.

The display device may display a fixed image (e.g., a logo or banner) in a compensation area (or logo/banner area) within the display area. The display device may control the luminance of the compensation area to be relatively lower than other areas, thereby preventing degradation of the compensation area.

The image processing device may also control the luminance of a luminance control area within the display area to be relatively lower than the other areas. In this case, image distortion may occur in the compensation area in which the compensation area and the luminance control area overlap.

SUMMARY

Embodiments provide a display device for preventing image distortion due to luminance decrease in a compensation area.

Embodiments provide a method of driving the display device.

Embodiments provide an electronic apparatus including the display device.

A display device according to embodiments may include a display panel which includes a compensation area of a display area, an image processing device, a timing controller which receives input image data corresponding to an input image and block luminance decrease rates for a plurality of blocks included in the display area of the input image from the image processing device, and a data driver which provides a data voltage generated based on the output image data to the display panel. The timing controller may include an average luminance decrease rate calculator which is configured to calculate an average luminance decrease rate of the input image for the compensation area based on the block luminance decrease rates for the plurality of blocks, a luminance decrease rate calculator which is configured to calculate a luminance decrease rate for the compensation area based on at least one of the average luminance decrease rate of the input image for the compensation area and a reference luminance decrease rate for the compensation area, and a data compensator which is configured to generate output image data by applying the luminance decrease rate for the compensation area to the input image data.

In an embodiment, the luminance decrease rate for the compensation area may be zero when the average luminance decrease rate of the input image for the compensation area is greater than 0%.

In an embodiment, the luminance decrease rate for the compensation area may be a fixed value when the average luminance decrease rate of the input image for the compensation area is greater than 0%.

In an embodiment, the luminance decrease rate for the compensation area may be a value obtained by subtracting a value obtained by multiplying the reference luminance decrease rate for the compensation area by the average luminance decrease rate of the input image for the compensation area from the reference luminance decrease rate for the compensation area.

In an embodiment, the luminance decrease rate for the compensation area may be the reference luminance decrease rate for the compensation area.

In an embodiment, the average luminance decrease rate of the input image for the compensation area may be an average value of block luminance decrease rates for blocks corresponding to the compensation area among the plurality of blocks.

In an embodiment, the timing controller may further include a block map converter which is configured to convert the input image from a first block map in which the display area includes n block columns and m block rows to a second block map in which the display area includes N block columns and M block rows. Each of n and m may be a natural number greater than 1, N may be a natural number different from n and greater than 1, and M may be a natural number different from m and greater than 1.

In an embodiment, the input image data may be generated by applying the block luminance decrease rates for the plurality of blocks to original image data.

A method of driving a display device including a display panel which includes a compensation area of a display area, the method may include calculating an average luminance decrease rate of an input image for the compensation area based on block luminance decrease rates for a plurality of blocks included in the display area of the input image received from an image processing device, calculating a luminance decrease rate for the compensation area based on at least one of the average luminance decrease rate of the input image for the compensation area and a reference luminance decrease rate for the compensation area, and generating output image data by applying the luminance decrease rate for the compensation area to input image data received from the image processing device.

In an embodiment, the luminance decrease rate for the compensation area may be zero when the average luminance decrease rate of the input image for the compensation area is greater than 0%.

In an embodiment, the luminance decrease rate for the compensation area may be a fixed value when the average luminance decrease rate of the input image for the compensation area is greater than 0%.

In an embodiment, the luminance decrease rate for the compensation area may be a value obtained by subtracting a value obtained by multiplying the reference luminance decrease rate for the compensation area by the average luminance decrease rate of the input image for the compensation area from the reference luminance decrease rate for the compensation area.

In an embodiment, the luminance decrease rate for the compensation area may be the reference luminance decrease rate for the compensation area.

In an embodiment, the average luminance decrease rate of the input image for the compensation area may be an average value of block luminance decrease rates for blocks corresponding to the compensation area among the plurality of blocks.

In an embodiment, the method may further include converting the input image from a first block map in which the display area includes n block columns and m block rows to a second block map in which the display area includes N block columns and M block rows before calculating the average luminance decrease rate of the input image for the compensation area. Each of n and m may be a natural number greater than 1, N may be a natural number different from n and greater than 1, and M may be a natural number different from m and greater than 1.

An electronic apparatus according to embodiments may include an image processing device which generates input image data corresponding to an input image and block luminance decrease rates for a plurality of blocks included in a display area of the input image, and a display device which displays an image based on data voltages. The display device may include a display panel which includes a compensation area of the display area, a timing controller which receives the input image data and block luminance decrease rates for the plurality of blocks from the image processing device, and a data driver which provides a data voltage generated based on the output image data to the display panel. The timing controller may include an average luminance decrease rate calculator which is configured to calculate an average luminance decrease rate of the input image for the compensation area based on the block luminance decrease rates for the plurality of blocks, a luminance decrease rate calculator which is configured to calculate a luminance decrease rate for the compensation area based on at least one of the average luminance decrease rate of the input image for the compensation area and a reference luminance decrease rate for the compensation area, and a data compensator which is configured to generate output image data by applying the luminance decrease rate for the compensation area to the input image data.

In an embodiment, the luminance decrease rate for the compensation area may be zero or a fixed value when the average luminance decrease rate of the input image for the compensation area is greater than 0%.

In an embodiment, the luminance decrease rate for the compensation area may be a value obtained by subtracting a value obtained by multiplying the reference luminance decrease rate for the compensation area by the average luminance decrease rate of the input image for the compensation area from the reference luminance decrease rate for the compensation area.

In an embodiment, the average luminance decrease rate of the input image for the compensation area may be an average value of block luminance decrease rates for blocks corresponding to the compensation area among the plurality of blocks.

In an embodiment, the image processing device may generate the input image data by applying the block luminance decrease rates for the plurality of blocks to original image data.

In the display device, the method of driving the same, and the electronic apparatus including the same according to the embodiments, the timing controller may calculate the average luminance decrease rate of the input image for the compensation area based on the block luminance decrease rates for the plurality of blocks, and may calculate the luminance decrease rate for the compensation area based on at least one of the average luminance decrease rate of the input image for the compensation area and the reference luminance decrease rate for the compensation area, so that image distortion due to the luminance decrease of the compensation area may be prevented.

BRIEF DESCRIPTION OF THE DRAWINGS

Illustrative, non-limiting embodiments will be more clearly understood from the following detailed description taken in conjunction with the accompanying drawings.

FIG. 6 is a table illustrating a reference luminance decrease rate, an average luminance decrease rate, and luminance decrease rates for a first logo area, a second logo area, and a banner area according to embodiments.

FIG. 12 is a table illustrating a reference area luminance decrease rate, a luminance decrease rate, and area luminance decrease rates for first to sixth luminance control areas according to embodiments.

DETAILED DESCRIPTION OF THE EMBODIMENTS

Figure 1:
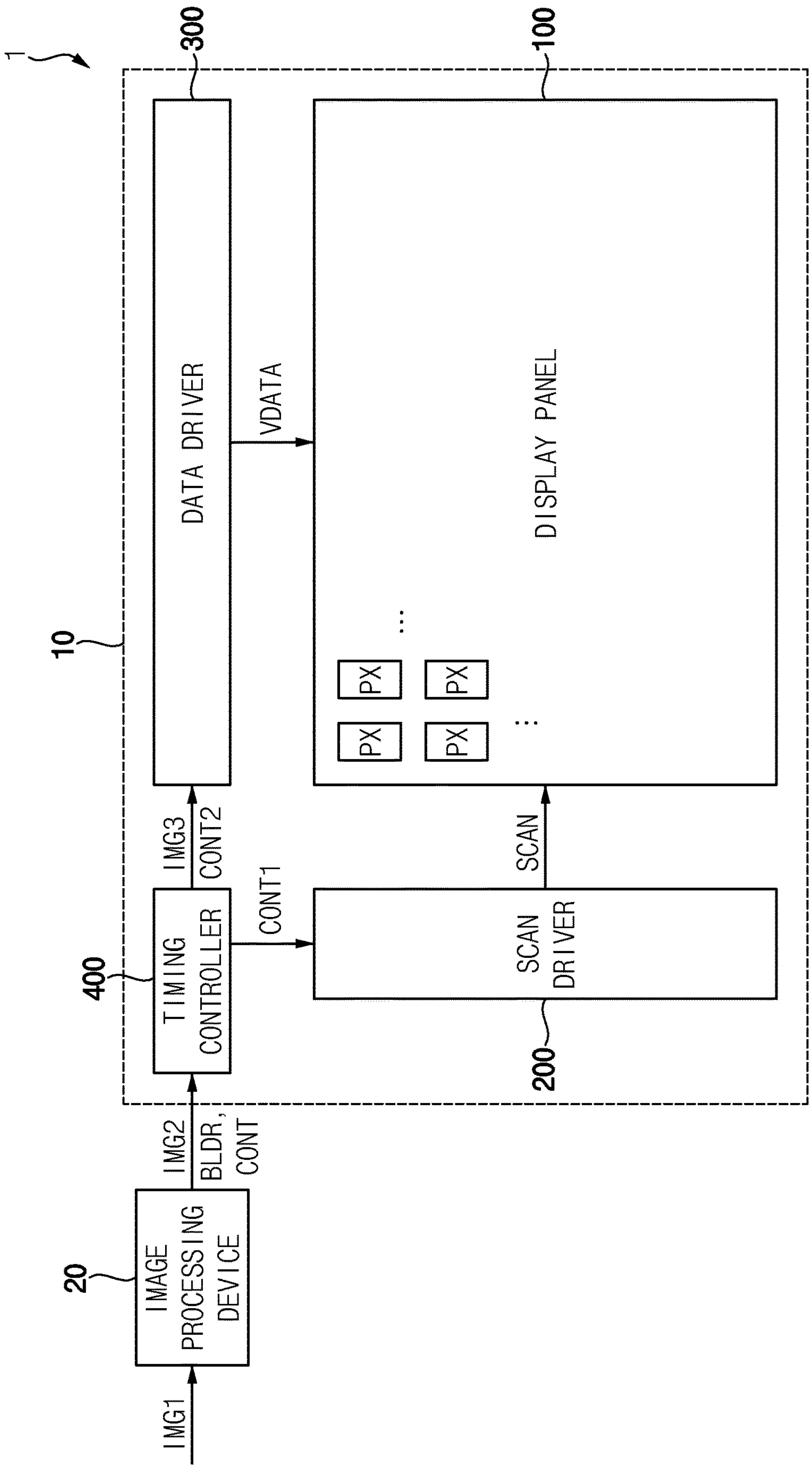
FIG. 1 is a block diagram illustrating an electronic apparatus including a display device according to an embodiment.

Hereinafter, an electronic apparatus, a display device, and a method of driving a display device according to embodiments of the present disclosure will be described in more detail with reference to the accompanying drawings. The same or similar reference numerals will be used for the same elements in the accompanying drawings.

Figure 2:
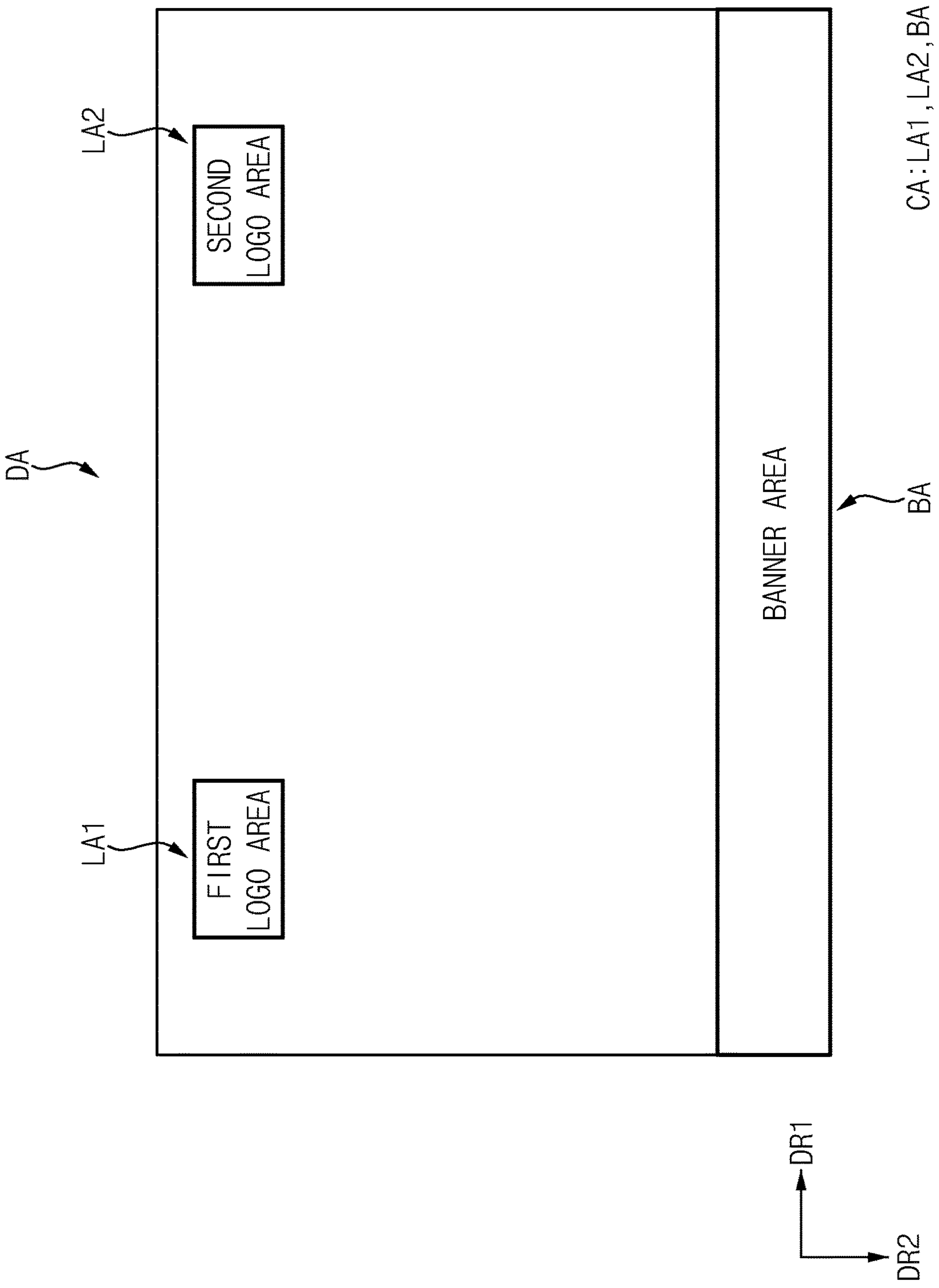
FIGS. 2 and 3 are diagrams for describing a display area of a display panel included in the display device in FIG. 1.
Figure 3:
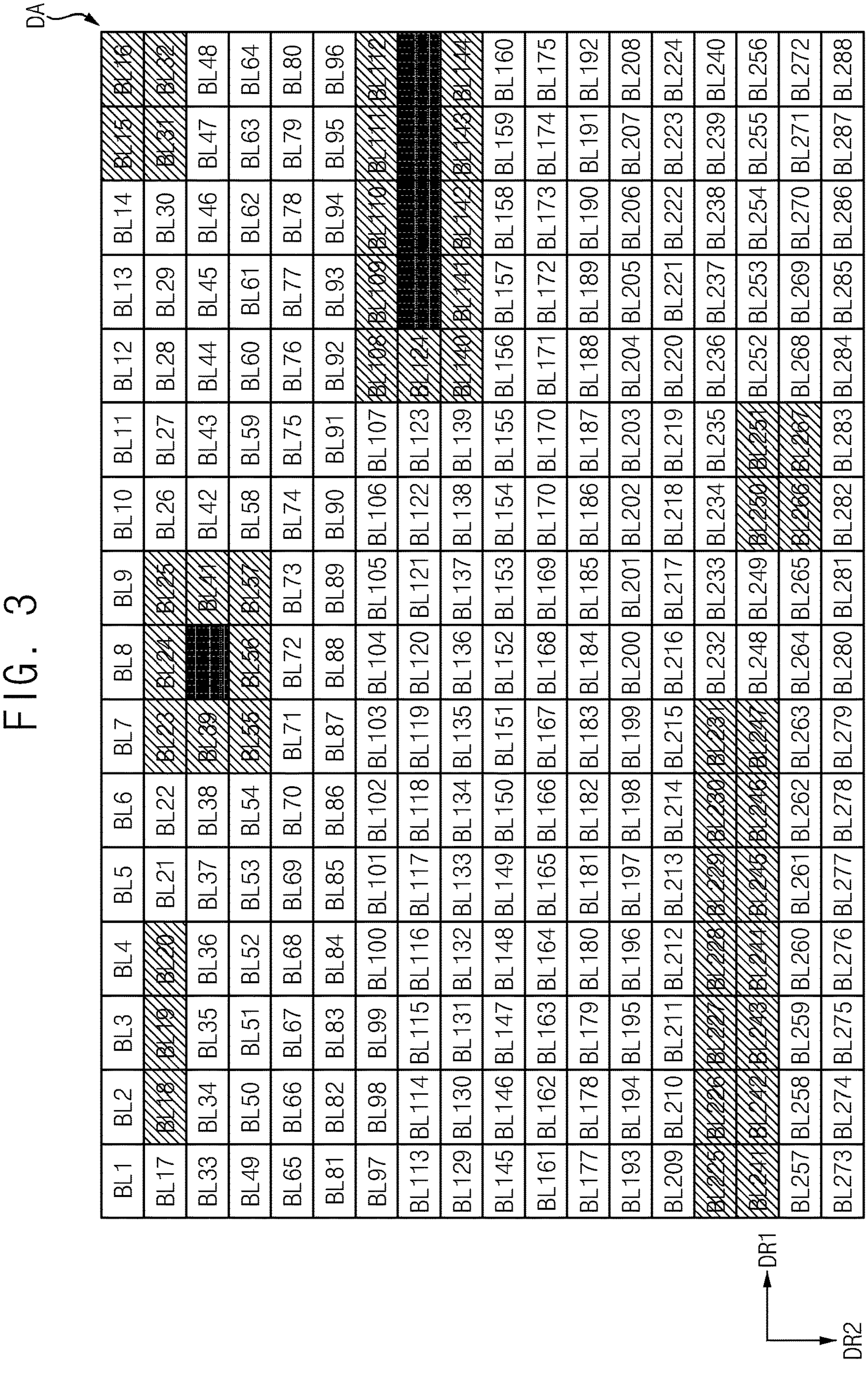

FIG. 1 is a block diagram illustrating an electronic apparatus 1 including a display device 10 according to an embodiment. FIGS. 2 and 3 are diagrams for describing a display area DA of a display panel 100 included in the display device 10 in FIG. 1.

Referring to FIGS. 1, 2, and 3, an electronic apparatus 1 may include a display device 10 and an image processing device 20.

The display device 10 may display an image based on input image data IMG2 corresponding to an input image IMG1. The display device 10 may include a display panel 100, a scan driver 200, a data driver 300, and a timing controller 400.

The display panel 100 may include various display elements such as organic light emitting diode ("OLED") or the like. Hereinafter, for convenience, the display panel 100 including the OLED as a display element will be described. However, the present disclosure is not limited thereto, and the display panel 100 may include various display elements such as a liquid crystal display ("LCD") element, an electrophoretic display ("EPD") element, an inorganic light emitting diode, or the like.

The display panel 100 may include a plurality of pixels PX. The pixels PX may constitute a display area DA. Each of the pixels PX may receive a scan signal SCAN and a data voltage VDATA. Each of the pixels PX may emit light based on the scan signal SCAN and the data voltage VDATA.

The display panel 100 may display an image in the display area DA based on the scan signal SCAN and the data voltage VDATA. The display area DA may include a compensation area CA. The display panel 100 may display a fixed image such as a logo or banner in the compensation area CA.

The compensation area CA may include at least one first compensation area LA1 and LA2 and/or at least one second compensation area BA. In an embodiment, a logo may be displayed in the first compensation area, and a banner may be displayed in the second compensation area, however, the present disclosure is not limited thereto. In an embodiment, the compensation area CA may include a first logo area LA1, a second logo area LA2, and a banner area BA.

The logo area LA1 or LA2 may be disposed adjacent to corners of the display area DA. FIG. 2 illustrates that the first logo area LA1 is disposed adjacent to an upper left corner of the display area DA and the second logo area LA2 is disposed adjacent to an upper right corner of the display area DA, however, the location of the first logo area LA1 and the location of the second logo area LA2 are not limited thereto.

The banner area BA may be disposed adjacent to a side of the display area DA. FIG. 2 illustrates that the banner area BA is disposed on a bottom side of the display area DA, however, the location of the banner area BA is not limited thereto.

The scan driver 200 (or gate driver) may generate the scan signal SCAN (or gate signal) based on a first control signal CONT1, and may provide the scan signal SCAN to the pixels PX. The first control signal CONT1 may include a scan start signal, a scan clock signal, or the like. The scan driver 200 may be implemented as a shift register, but is not limited thereto. In an embodiment, the scan driver 200 may be formed on the display panel 100. In another embodiment, the scan driver 200 may be implemented as an integrated circuit, and may be mounted on a flexible circuit board that is connected to the display panel 100.

The data driver 300 (or source driver) may generate the data voltage VDATA based on output image data IMG3 received from the timing controller 400 corresponding to the output image data IMG2 and a second control signal CONT2, and may provide the data voltage VDATA to the pixels PX. The second control signal CONT2 may include a data clock signal, a data enable signal, or the like. In an embodiment, the data driver 300 may be implemented as an integrated circuit (e.g., a driver IC), and may be mounted on a flexible circuit board that is connected to the display panel 100.

The timing controller 400 may control an operation of the scan driver 200 and an operation of the data driver 300. The timing controller 400 may generate the output image data IMG3, the first control signal CONT1, and the second control signal CONT2 based on the input image data IMG2 and a control signal CONT. The timing controller 400 may provide the first control signal CONT1 to the scan driver 200, and may provide the output image data IMG3 and the second control signal CONT2 to the data driver 300. The control signal may include a vertical synchronization signal, a horizontal synchronization signal, a clock signal, or the like.

The timing controller 400 may analyze the input image data IMG2 to detect the compensation area CA within the display area DA. The timing controller 400 may detect the compensation area CA by accumulating grayscale values of the input image data IMG2 corresponding to a plurality of input images.

FIG. 1 illustrates that the timing controller 400 is implemented independently of the data driver 300, however, the present disclosure is not limited thereto. For example, the timing controller 400 and the data driver 300 may be implemented as single integrated circuit.

The image processing device 20 may generate the input image data IMG2 based on original image data IMG1 received from an external image source and corresponding to an original image, and may provide the input image data IMG2 to the timing controller 400. The image processing device 20 may maintain or reduce luminance of a plurality of blocks BL1 to BL288 included in the display area DA of the input image. Accordingly, the image processing device 20 may maintain or reduce a luminance for each block. In an embodiment, the image processing device 20 may be implemented as a System on Chip ("SoC").

The display area DA may include the blocks BL1 to BL288. The blocks BL1 to BL288 are arranged along the first direction DR1 and the second direction DR2 to form a plurality of block columns and a plurality of block rows. FIG. 3 illustrates that the display area DA includes 288 blocks BL1 to BL288 which are arranged in 16 block columns and 18 block rows, however, the number and the arrangement of the blocks BL1 to BL288 are not limited thereto.

The image processing device 20 may generate block luminance decrease rates BLDR for each of the blocks BL1 to BL288. In an embodiment, each of the block luminance decrease rates BLDR for the blocks BL1 to BL288 may have one of 0%, 25%, and 50%. In FIG. 3, the block luminance decrease rates BLDR for the blocks with hatching BL15, BL16, BL18 to BL20, BL23 to BL25, BL31, BL32, BL39, BL41, BL55 to BL57, BL108 to BL112, BL124, BL140 to BL144, BL225 to BL231, BL241 to BL247, BL250, BL251, BL266, and BL267 may be 25%, the block luminance decrease rates BLDR for the blocks with dots arranged in rows and columns BL40, BL125-BL128 may be 50%, and block luminance decrease rates BLDR for the remaining blocks may be 0%.

In an embodiment, the image processing device 20 may decide the block luminance decrease rates BLDR for the blocks BL1 to BL288 in order to reduce luminance of blocks on which the fixed image (e.g., the logo or banner) is displayed. The image processing device 20 may analyze the original image data IMG1 to detect the blocks on which the fixed image (e.g., the logo or banner) is displayed. The image processing device 20 may accumulate grayscale values of the original image data IMG1 corresponding to a plurality of original images to detect the blocks on which the fixed image (e.g., the logo or banner) is displayed. For example, as illustrated in FIG. 3, the image processing device 20 may set the block luminance decrease rates BLDR for the blocks BL15, BL16, BL18 to BL20, BL23 to BL25, BL31, BL32, BL39 to BL41, BL55 to BL57, BL108 to BL112, BL124 to BL128, BL140 to BL144, BL225 to BL231, BL241 to BL247, BL250, BL251, BL266, and BL267 to 25% or 50%, and may set the block luminance decrease rates BLDR for the remaining blocks on which the fixed image (e.g., the logo or banner) is not displayed to 0%.

The image processing device 20 may generate the input image data IMG2 by applying the block luminance decrease rates BLDR for the blocks BL1 to BL288 to the original image data IMG1, and may provide the block luminance decrease rates BLDR for the blocks BL1 to BL288 to the timing controller 400. Accordingly, the luminance of the blocks BL1 to BL288 of the input image corresponding to the input image data IMG2 may be maintained or reduced compared with the luminance of the blocks BL1 to BL288 of the original image corresponding to the original image data IMG1.

The timing controller 400 may receive the input image data IMG2 and the block luminance decrease rates BLDR for the blocks BL1 to BL288 from the image processing device 20. The timing controller 400 may calculate an average luminance decrease rate of the input image for the compensation area CA based on the block luminance decrease rates BLDR for the blocks BL1 to BL288. The timing controller 400 may calculate the average luminance decrease rate of the input image for the compensation area CA based on the block luminance decrease rates BLDR for blocks corresponding to the compensation area CA.

The timing controller 400 may calculate a luminance decrease rate LDR for the compensation area CA based on at least one of the average luminance decrease rate ALDR of the input image for the compensation area CA and a reference luminance decrease rate RLDR for the compensation area CA. The reference luminance decrease rate may be a predetermined luminance decrease rate for the compensation area CA. The reference luminance decrease rate may be determined based on a case in which the block luminance decrease rates BLDR for the blocks BL1 to BL288 received from the image processing device 20 are 0%. In other words, the reference luminance decrease rate may be a luminance decrease rate determined based on a case in which the image processing device 20 does not reduce luminance of the input image. Accordingly, the timing controller 400 may calculate the luminance decrease rate for the compensation area CA by considering the block luminance decrease rates BLDR for the blocks BL1 to BL288 of the image processing device 20. The timing controller 400 may generate the output image data IMG3 by applying the luminance decrease rate for the compensation area CA to the input image data IMG2.

Figure 4:
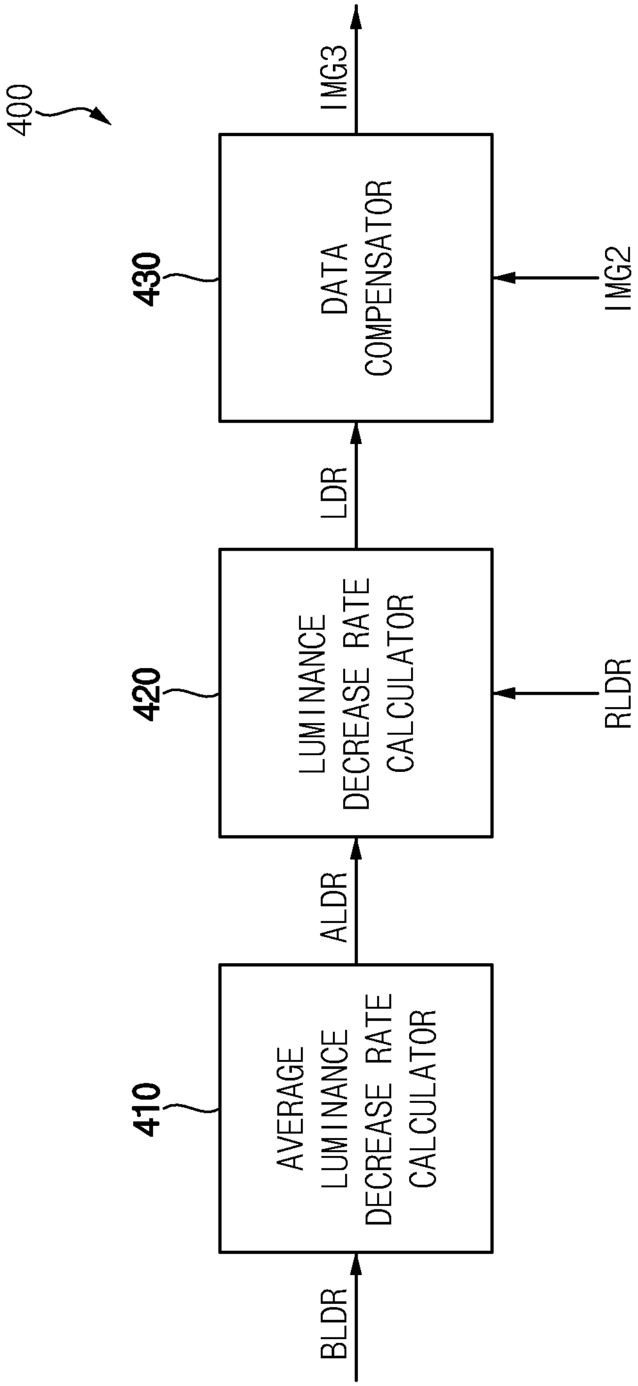
FIG. 4 is a block diagram illustrating a timing controller included in the display device in FIG. 1.
Figure 5:
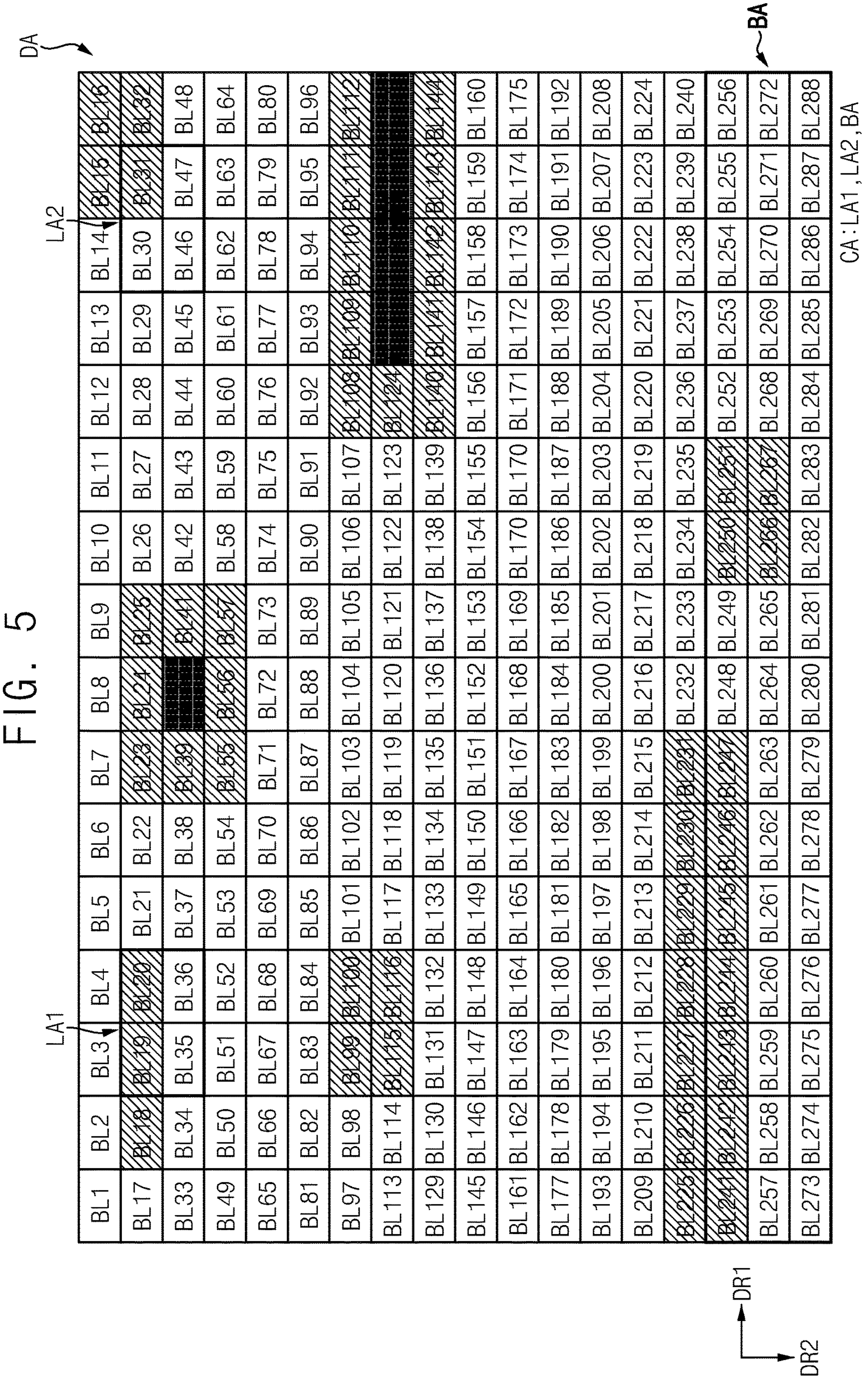
FIG. 5 is a diagram for describing an operation of the timing controller in FIG. 4.

FIG. 4 is a block diagram illustrating the timing controller 400 included in the display device 10 in FIG. 1. FIG. 5 is a diagram for describing an operation of the timing controller 400 in FIG. 4. FIG. 6 is a table illustrating the reference luminance decrease rate, the average luminance decrease rate, and the luminance decrease rates for the first logo area, the second logo area, and the banner area according to embodiments.

Referring to FIGS. 4, 5, and 6, the timing controller 400 may include an average luminance decrease rate calculator 410, a luminance decrease rate calculator 420, and a data compensator 430.

The average luminance decrease rate calculator 410 may calculate the average luminance decrease rate ALDR of the input image for the compensation area CA based on the block luminance decrease rates BLDR for the blocks BL1 to BL288. The average luminance decrease rate calculator 410 may calculate the average luminance decrease rate ALDR of the input image for the compensation area CA by arithmetic averaging the block luminance decrease rates BLDR for blocks corresponding to the compensation area CA. The average luminance decrease rate ALDR of the input image for the compensation area CA may be an average value of the block luminance decrease rates BLDR for the blocks corresponding to the compensation area CA of the input image.

The first logo area LA1 may correspond to the $19^{th}$ block BL19, the $20^{th}$ block BL20, the $35^{th}$ block BL35, and the $36^{th}$ block BL36, and the average luminance decrease rate ALDR of the input image for the first logo area LA1 may be an average value ((25+25+0+0)/4=about 13%) of the block luminance decrease rate BLDR of the $19^{th}$ block BL19, the $20^{th}$ block BL20, the $35^{th}$ block BL35, and the $36^{th}$ block BL36.

The second logo area LA2 may correspond to the $30^{th}$ block BL30, the $31^{th}$ block BL31, the $46^{th}$ block BL46, and the $47^{th}$ block BL47, and the average luminance decrease rate ALDR of the input image for the second logo area LA2 may be an average value ((0+25+0+0)/4=about 7%) of the block luminance decrease rates BLDR of the $30^{th}$ block BL30, the $31^{th}$ block BL31, the $46^{th}$ block BL46, and the $47^{th}$ block BL47.

The banner area BA may correspond to the $241^{st}$ block BL241 to the $288^{th}$ block BL288, and the average luminance decrease rate ALDR of the input image for the banner area BA may be an average value ((25*11+0*37)/48=about 6%) of the block luminance decrease rates BLDR of the $241^{st}$ block BL241 to the $288^{th}$ block BL288.

The luminance decrease rate calculator 420 may calculate the luminance decrease rate LDR for the compensation area CA based on at least one of the average luminance decrease rate ALDR of the input image for the compensation area CA and the reference luminance decrease rate RLDR for the compensation area CA. In an embodiment, the reference luminance decrease rate RLDR for the first logo area LA1 may be 30, the reference luminance decrease rate RLDR for the second logo area LA2 may be 40, and the reference luminance decrease rate RLDR for the banner area BA may be 20.

In an embodiment (CASE1), when the average luminance decrease rate ALDR of the input image for the compensation area CA is greater than 0%, the luminance decrease rate calculator 420 may calculate the luminance decrease rate LDR for the compensation area CA as zero. In other words, when the image processing device 20 reduces the luminance of the input image for the compensation area CA, the timing controller 400 may not reduce the luminance of the output image for the compensation area CA. In the embodiment (CASE1), the luminance decrease rates LDR for the first logo area LA1, the second logo area LA2, and the banner area BA may be zero. According to the embodiment (CASE1), when the image processing device 20 reduces the luminance of the input image for the compensation area CA, the timing controller 400 may not reduce the luminance of the output image for the compensation area CA. Accordingly, image distortion due to a repetition of the luminance decrease of the input image by the image processing device 20 and the luminance decrease of the output image by the timing controller 400 may be prevented.

In an embodiment (CASE2), when the average luminance decrease rate ALDR of the input image for the compensation area CA is greater than 0%, the luminance decrease rate calculator 420 may calculate the luminance decrease rate LDR for the compensation area CA as a fixed value. In other words, when the image processing device 20 reduces the luminance of the input image for the compensation area CA, the timing controller 400 may reduce the luminance of the output image for the compensation area CA by a fixed value. In the embodiment (CASE2), the luminance decrease rates LDR for the first logo area LA1, the second logo area LA2, and the banner area BA may be fixed values (e.g., 15). According to the embodiment (CASE2), when the image processing device 20 reduces the luminance of the input image for the compensation area CA, the timing controller 400 may reduce the luminance of the output image for the compensation area CA by the fixed value. Accordingly, image distortion due to a repetition of the luminance decrease of the input image by the image processing device 20 and the luminance decrease of the output image by the timing controller 400 may be prevented.

In an embodiment (CASE3), the luminance decrease rate calculator 420 may calculate the luminance decrease rate LDR for the compensation area CA as a value obtained by subtracting a value obtained by multiplying the reference luminance decrease rate RLDR for the compensation area CA by the average luminance decrease rate ALDR of the input image for the compensation area CA from the reference luminance decrease rate RLDR for the compensation area CA, as shown in Equation 1. In other words, the timing controller 400 may adjust the luminance decrease rate LDR of the output image for the compensation area CA by considering the average luminance decrease rate ALDR of the input image for the compensation area CA of the image processing device 20. In the embodiment (CASE3), the luminance decrease rate LDR for the first logo area LA1 may be about 26 (30-30*0.13), the luminance decrease rate LDR for the second logo area LA2 may be about 37 (40-40*0.07), and the luminance decrease rate LDR for the banner area BA may be about 18 (20-20*0.06). According to the embodiment (CASE3), the timing controller 400 may reduce the luminance of the output image for the compensation area CA by considering the luminance of the input image for the compensation area CA reduced by the image processing device 20. Accordingly, image distortion due to a repetition of the luminance decrease of the input image by the image processing device 20 and the luminance decrease of the output image by the timing controller 400 may be prevented.

$$LDR=RLDR-RLDR*ALDR \quad \text{[Equation 1]}$$

In an embodiment (CASE4), the luminance decrease rate calculator 420 may calculate the luminance decrease rate LDR for the compensation area CA as the reference luminance decrease rate RLDR for the compensation area CA. In other words, the timing controller 400 may adjust the luminance decrease rate LDR of the output image for the compensation area CA without considering the average luminance decrease rate ALDR of the input image for the compensation area CA of the image processing device 20. In the embodiment (CASE4), the luminance decrease rate LDR for the first logo area LA1 may be 30, the luminance decrease rate LDR for the second logo area LA2 may be 40, and the luminance decrease rate LDR for the banner area BA may be 20. According to the embodiment (CASE4), the timing controller 400 may reduce the luminance of the output image for the compensation area CA without considering the luminance of the input image for the compensation area CA reduced by the image processing device 20. When image distortion does not occur although the luminance decrease of the input image by the image processing device 20 and the luminance decrease of the output image by the timing controller 400 are repeated, the luminance of the output image may be controlled according to the embodiment (CASE4).

The data compensator 430 may generate the output image data IMG3 by applying the luminance decrease rate LDR for the compensation area CA to the input image data IMG2. The image processing device 20 may generate the input image data IMG2 by applying the block luminance decrease rates BLDR for the blocks BL1 to BL288 to the original image data IMG1, and the timing controller 400 may generate the output image data IMG3 by applying the luminance decrease rate LDR for the compensation area CA calculated based on the block luminance decrease rates BLDR for the blocks BL1 to BL288 generated by the image processing device 20 to the input image data IMG2. Therefore, the timing controller 400 may adjust the luminance of the output image in consideration of the luminance adjustment for the input image of the image processing device 20, and accordingly, image distortion due to luminance decrease of the compensation area CA may be prevented.

Figure 7:
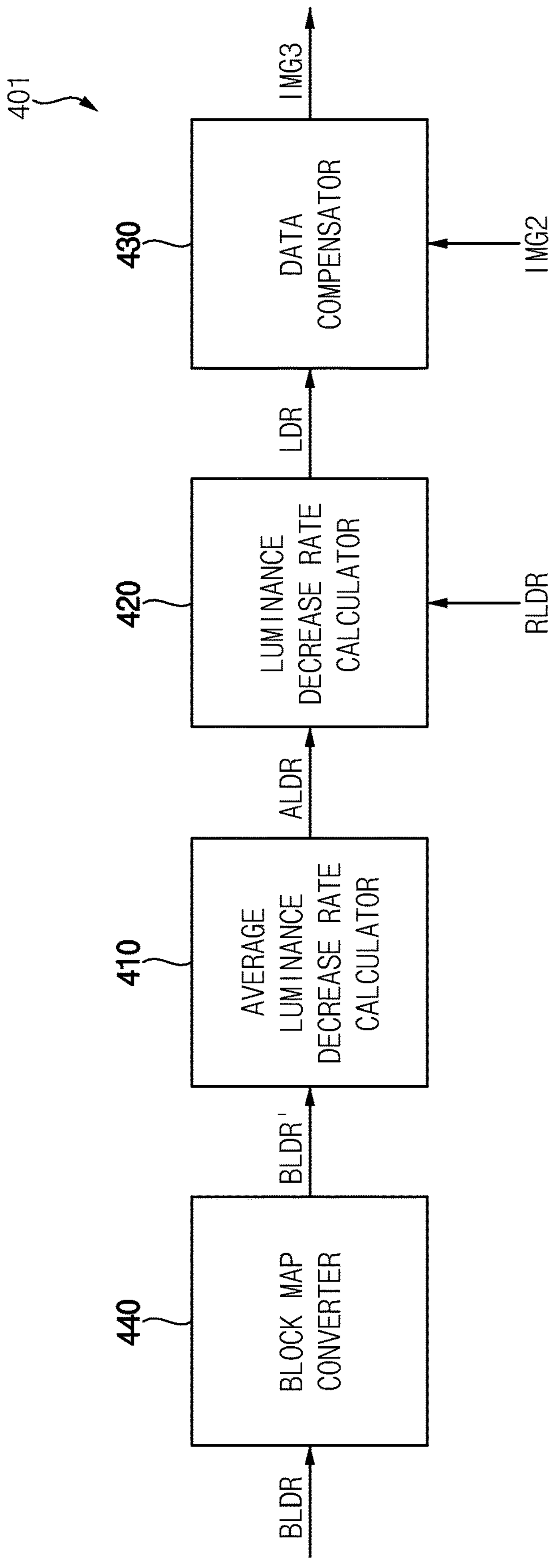
FIG. 7 is a block diagram illustrating a timing controller according to an embodiment.
Figure 8:
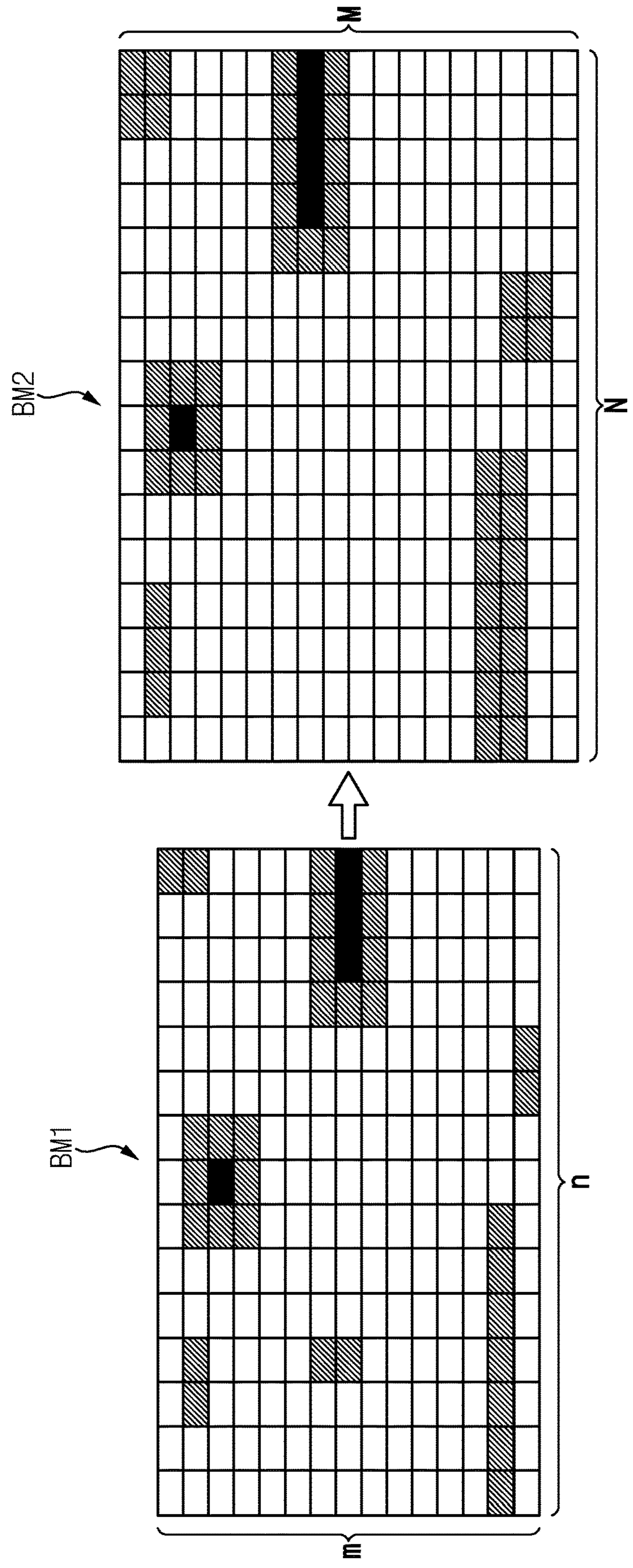
FIG. 8 is a diagram for describing an operation of a block map converter included in the timing controller in FIG. 7.

FIG. 7 is a block diagram illustrating a timing controller 401 according to an embodiment. FIG. 8 is a diagram for describing an operation of a block map converter 440 included in the timing controller 401 in FIG. 7.

Referring to FIGS. 7 and 8, the timing controller 401 may include a block map converter 440, an average luminance decrease rate calculator 410, a luminance decrease rate calculator 420, and a data compensator 430. The timing controller 401 described with reference to FIG. 7 may be substantially the same as or similar to the timing controller 400 described with reference to FIG. 4 except for further including the block map converter 440. Accordingly, descriptions of repeated components will be omitted.

The block map converter 440 may convert the input image from a first block map BM1 in which the display area DA includes n block columns (n is a natural number greater than 1) and m block rows (m is a natural number greater than 1) to a second block map BM2 in which the display area DA includes N block columns (N is a natural number different from n and greater than 1) block columns and M block rows (M is a natural number different from m and greater than 1). The first block map BM1 processed by the image processing device 20 may be different from the second block map BM2 processed by the timing controller 401, and accordingly, the block map converter 440 may convert the input image from the first block map BM1 to the second block map BM2. In an embodiment, the block map converter 440 may convert the input image from the first block map BM1 in which the display area DA includes 15 block columns and 15 block rows to the second block map BM2 in which the display area DA includes 16 block columns and 18 block rows.

The block map converter 440 may convert the input image from the first block map BM1 to the second block map BM2, so that the number of blocks included in the display area DA may change, and accordingly, the block luminance decrease rates BLDR for blocks included in the first block map BM1 may be converted to block luminance decrease rates BLDR' for blocks included in the second block map BM2.

The average luminance decrease rate calculator 410 may calculate the average luminance decrease rate ALDR of the input image for the compensation area CA based on the block luminance decrease rates BLDR' for the blocks included in the second block map BM2. Since the average luminance decrease rate calculator 410, the luminance decrease rate calculator 420, and the data compensator 430 included in the timing controller 401 described with reference to FIG. 7 are substantially the same as the average luminance decrease rate calculator 410, the luminance decrease rate calculator 420, and the data compensator 430 included in the timing controller 400 described with reference to FIG. 4, descriptions thereof will be omitted.

Figure 9:
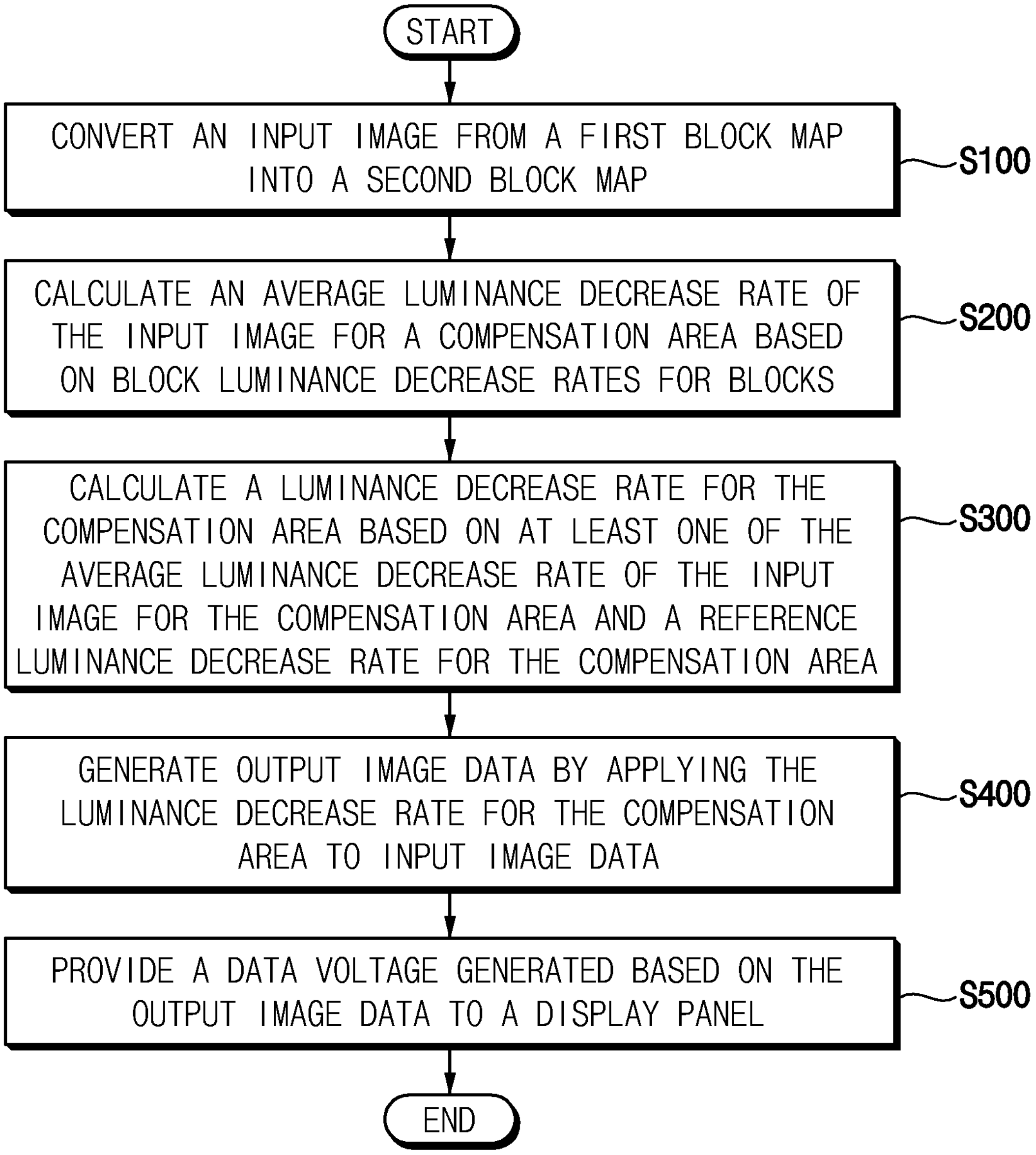
FIG. 9 is a flowchart illustrating a method of driving a display device according to an embodiment.

FIG. 9 is a flowchart illustrating a method of driving a display device according to an embodiment. FIG. 9 may represent a method of driving the display device 10 described with reference to FIGS. 1 to 8.

Referring to FIG. 9, the timing controller 401 may convert the input image from the first block map in which the display area includes n block columns and m block rows to the second block map in which the display area includes N block columns and M block rows (S100). The timing controller 400 described with reference to FIG. 3 may omit converting the input image from the first block map to the second block map (S100).

The timing controller 400 or 401 may calculate the average luminance decrease rate of the input image for the compensation area based on the block luminance decrease rates for the blocks (S200). The average luminance decrease rate of the input image for the compensation area may be an average value of the block luminance decrease rates for blocks corresponding to the compensation area among the blocks of the input image.

The timing controller 400 or 401 may calculate the luminance decrease rate for the compensation area based on at least one of the average luminance decrease rate of the input image for the compensation area and the reference luminance decrease rate for the compensation area (S300).

In an embodiment, when the average luminance decrease rate of the input image for the compensation area is greater than 0%, the luminance decrease rate for the compensation area may be zero.

In an embodiment, when the average luminance decrease rate of the input image for the compensation area is greater than 0%, the luminance decrease rate for the compensation area may be a fixed value.

In an embodiment, the luminance decrease rate for the compensation area may be a value obtained by subtracting a value obtained by multiplying the reference luminance decrease rate for the compensation area by the average luminance decrease rate of the input image for the compensation area from the reference luminance decrease rate for the compensation area.

In an embodiment, the luminance decrease rate for the compensation area may be the reference luminance decrease rate for the compensation area.

The timing controller 400 or 401 may generate the output image data by applying the luminance decrease rate for the compensation area to the input image data (S400). The data driver 300 may generate the data voltage based on the output image data, and may provide the data voltage to the display panel 100 (S500). The display panel 100 may display an image based on the data voltage.

Figure 10:
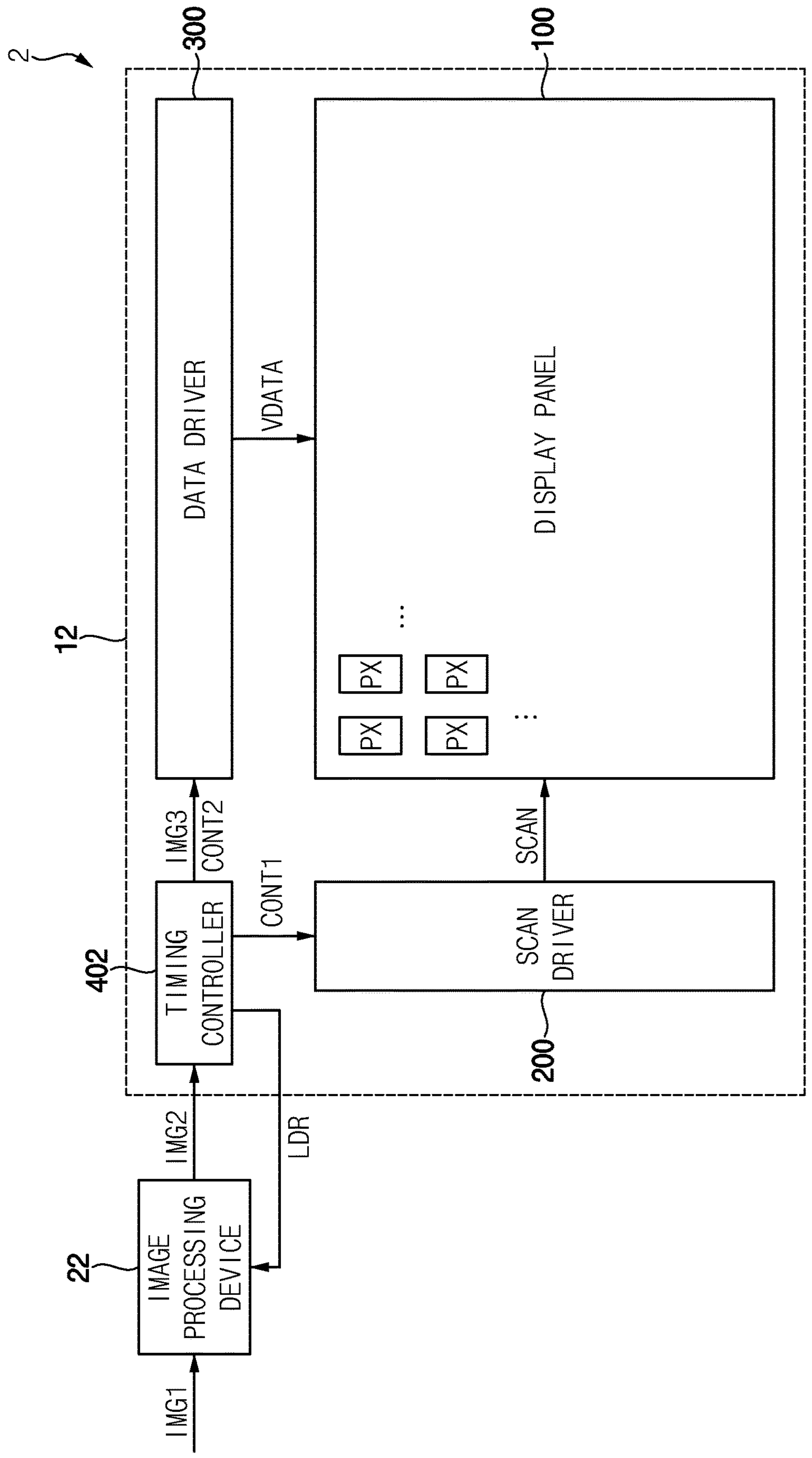
FIG. 10 is a block diagram illustrating an electronic apparatus including a display device according to an embodiment.
Figure 11:
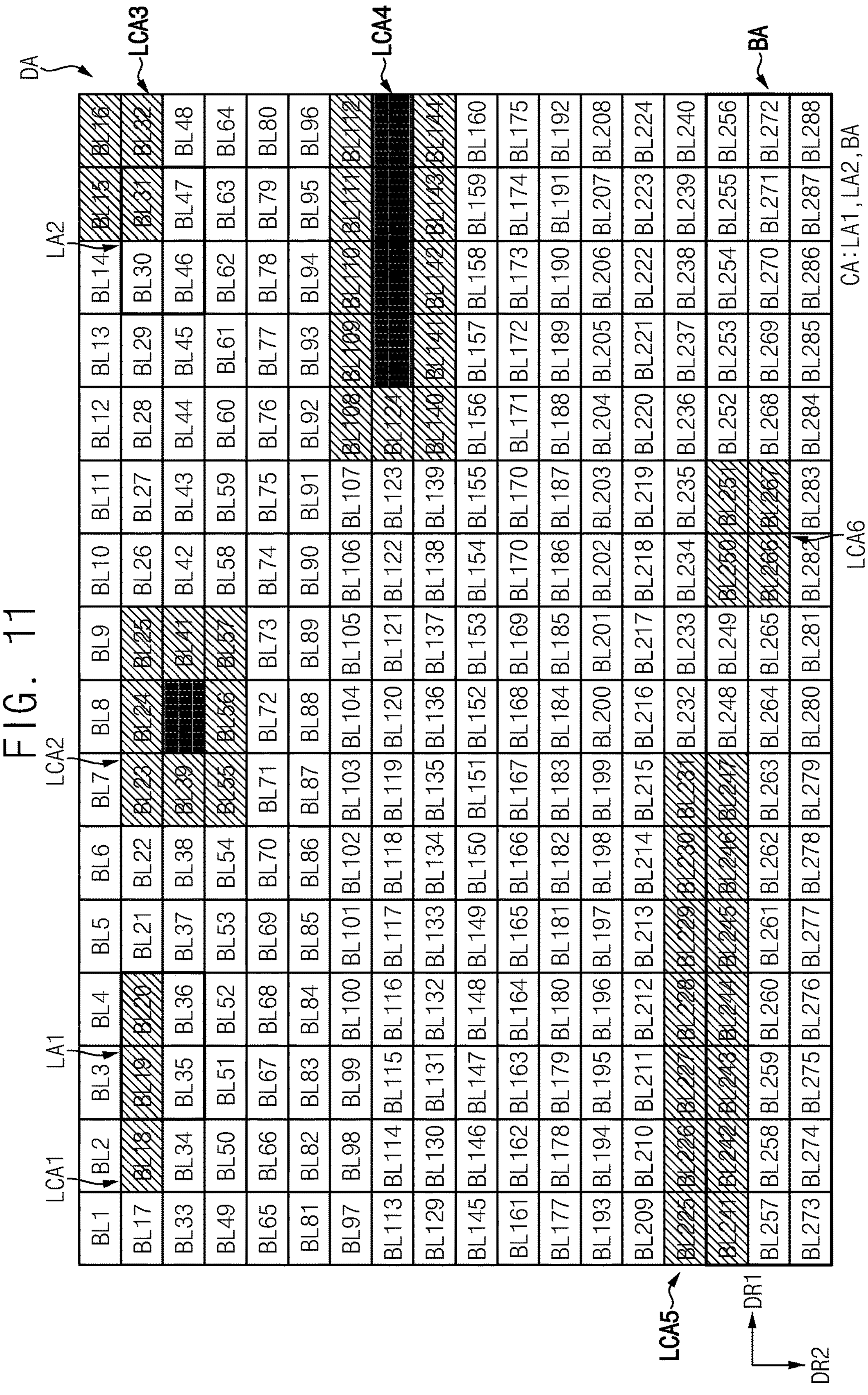
FIG. 11 is a diagram for describing an operation of an image processing device included in the electronic apparatus in FIG. 10.

FIG. 10 is a block diagram illustrating an electronic apparatus 2 including a display device 12 according to an embodiment. FIG. 11 is a diagram for describing an operation of an image processing device 22 included in the electronic apparatus 2 in FIG. 10. FIG. 12 is a table illustrating a reference area luminance decrease rate, a luminance decrease rate, and area luminance decrease rates for first to sixth luminance control areas according to embodiments.

Referring to FIGS. 10, 11, and 12, an electronic apparatus 2 may include a display device 12 and an image processing device 22. The electronic apparatus 2 described with reference to FIGS. 10 to 12 may be substantially the same as or similar to the electronic apparatus 1 described with reference to FIGS. 1 to 8 except for an operation of a timing controller 402 and an operation of an image processing device 22. Accordingly, descriptions of repeated components will be omitted.

The timing controller 402 may receive the input image data IMG2 from the image processing device 22. The timing controller 402 may calculate the luminance decrease rate LDR for the compensation area CA as a reference luminance decrease rate for the compensation area CA. The reference luminance decrease rate may be a predetermined luminance decrease rate for the compensation area CA. The reference luminance decrease rate may be determined based on a case in which an area luminance decrease rate for a luminance control area calculated by the image processing device 22 is 0%. In other words, the reference luminance decrease rate may be a luminance decrease rate determined based on a case in which the image processing device 22 does not reduce the luminance of the input image. Accordingly, the timing controller 402 may calculate the luminance decrease rate LDR for the compensation area CA without considering the luminance decrease of the image processing device 22. In an embodiment, the luminance decrease rate LDR for the first logo area LA1 may be 30, the luminance decrease rate LDR for the second logo area LA2 may be 40, and the luminance decrease rate LDR for the banner area BA may be 20, when the reference luminance decrease rate for the first logo area LA1 is 30, the reference luminance decrease rate for the second logo area LA2 is 40, and the reference luminance decrease rate for the banner area BA is 20.

The image processing device 22 may generate the input image data IMG2 based on the original image data IMG1 received from an external image source and the luminance decrease rate LDR for the compensation area CA received from the timing controller 402, and may provide the input image data IMG2 to the timing controller 402.

The image processing device 22 may calculate the area luminance decrease rate for the luminance control area based on at least one of the luminance decrease rate LDR for the compensation area CA and a reference area luminance decrease rate for the luminance control area. The reference area luminance decrease rate may be a predetermined area luminance decrease rate for the luminance control area. The reference area luminance decrease rate may be determined based on a case in which the luminance decrease rate LDR for the compensation area CA received from the timing controller 402 is 0%. In other words, the reference area luminance decrease rate may be an area luminance decrease rate determined based on a case in which the timing controller 402 does not reduce the luminance of the output image.

In an embodiment, a first luminance control area LCA1 may include the $18^{th}$ to $20^{th}$ blocks BL18 to BL20, a second luminance control area LCA2 may include the $23^{rd}$ to $25^{th}$, $39^{th}$ to $41^{st}$, and $55^{th}$ to $57^{th}$ blocks BL23 to BL25, BL39 to BL41, and BL55 to BL57, a third luminance control area LCA3 may include the $15^{th}$, $16^{th}$, $31^{st}$, and $32^{nd}$ blocks BL15, BL16, BL31, and BL32, a fourth luminance control area LCA4 may include the $108^{th}$ to $112^{th}$, $124^{th}$ to $128^{th}$, and $140^{th}$ to $144^{th}$ blocks BL108 to BL112, BL124 to BL128, and BL140 to BL144, a fifth luminance control area LCA5 may include the $225^{th}$ to $231^{st}$ and $241^{st}$ to $247^{th}$ blocks BL225 to BL231 and BL241 to BL247, and a sixth luminance control area LCA6 may include the 250$^{th}$, 251$^{st}$, 266$^{th}$, and 267$^{th}$ blocks BL250, BL251, BL266, and BL267. In the above embodiment, the reference area luminance decrease rate for the first luminance control area LCA1 may be an average value ((25+25+25)/3=about 25%) of the block luminance decrease rates of the 18$^{th}$ to 20$^{th}$ blocks BL18 to BL20, the reference area luminance decrease rate for the second luminance control area LCA2 may be an average value ((25+25+25+25+50+25+25+25+25)/9=about 28%) of the block luminance decrease rates of the 23$^{th}$ to 25$^{th}$, 39$^{th}$ to 41$^{st}$, and 55$^{th}$ to 57$^{th}$ blocks BL23 to BL25, BL39 to BL41, and BL55 to BL57, the reference area luminance decrease rate for the third luminance control area LCA3 may be an average value ((25+25+25+25)/4=about 25%) of the block luminance decrease rates of the 15$^{th}$, 16$^{th}$, 31$^{st}$, and 32$^{nd}$ blocks BL15, BL16, BL31, and BL32, the reference area luminance decrease rate for the fourth luminance control area LCA4 may be an average value ((25+25+25+25+25+25+50+50+50+50+25+25+25+25+25)/15=about 32%) of the block luminance decrease rates of the 108$^{th}$ to 112$^{th}$, 124$^{th}$ to 128$^{th}$, and 140$^{th}$ to 144$^{th}$ blocks BL108 to BL112, BL124 to BL128, and BL140 to BL144, the reference area luminance decrease rate for the fifth luminance control region LCA5 may be an average value ((25+25+25+25+25+25+25+25+25+25+25+25+25+25)/14=about 25%) of the block luminance decrease rates of the 225$^{th}$ to 231$^{st}$ and 241$^{st}$ to 247$^{th}$ blocks BL225 to BL231 and BL241 to BL247, and the reference area luminance decrease rate for the sixth luminance control region LCA6 may be an average value ((25+25+25+25)/4=about 25%) of the block luminance decrease rates of the 250$^{th}$, 251$^{st}$, 266$^{th}$, and 267$^{th}$ blocks BL250, BL251, BL266, and BL267.

In an embodiment (CASE1), when the luminance decrease rate LDR of the output image for the luminance control area is greater than 0%, the image processing device 22 may calculate the area luminance decrease rate for the luminance control area as zero. In other words, when the timing controller 402 reduces the luminance of the output image for the luminance control area, the image processing device 22 may not reduce the luminance of the input image for the luminance control area. In the embodiment (CASE1), the area luminance decrease rates for the first to sixth luminance control areas LCA1 to LCA6 may be zero. According to the embodiment (CASE1), when the timing controller 402 reduces the luminance of the output image for the luminance control area, the image processing device 22 may not reduce the luminance of the input image for the luminance control area. Accordingly, image distortion due to a repetition of the luminance decrease of the output image by the timing controller 402 and the luminance decrease of the input image by the image processing device 22 may be prevented.

In an embodiment (CASE2), when the luminance decrease rate LDR of the output image for the luminance control area is greater than 0%, the image processing device 22 may calculate the area luminance decrease rate for the luminance control area as a fixed value. In other words, when the timing controller 402 reduces the luminance of the output image for the luminance control area, the image processing device 22 may reduce the luminance of the input image for the luminance control area by a fixed value. In the embodiment (CASE2), the area luminance decrease rates for the first to sixth luminance control areas LCA1 to LCA6 may be fixed values (e.g., 15). According to the embodiment (CASE2), when the timing controller 402 reduces the luminance of the output image for the luminance control area, the image processing device 22 may reduce the luminance of the input image for the luminance control area by the fixed value. Accordingly, image distortion due to a repetition of the luminance decrease of the output image by the timing controller 402 and the luminance decrease of the input image by the image processing device 22 may be prevented.

In an embodiment (CASE3), the image processing device 22 may calculate the area luminance decrease rate for the luminance control area as a value obtained by subtracting a value obtained by multiplying the reference area luminance decrease rate for the luminance control area by the luminance decrease rate LDR for the compensation area CA overlapping the luminance control area from the reference area luminance decrease rate for the luminance control area. In other words, the image processing device 22 may adjust the area luminance decrease rate for the luminance control area by considering the luminance decrease rate LDR for the compensation area CA of the timing controller 402. In the embodiment (CASE3), the area luminance decrease rate for the first luminance control area LCA1 may be about 17 (25-25*0.3), the area luminance decrease rate for the second luminance control area LCA2 may be about 28 (28-28*0), the area luminance decrease rate for the third luminance control area LCA3 may be about 17 (25-25*0.3), the area luminance decrease rate for the fourth luminance control area LCA4 may be about 32 (32-32*0), the area luminance decrease rate for the fifth luminance control area LCA5 may be about 20 (25-25*0.2), and the area luminance decrease rate for the sixth luminance control area LCA6 may be about 20 (25-25*0.2). According to the embodiment (CASE3), the image processing device 22 may reduce the luminance of the input image for the luminance control area by considering the luminance of the output image for the luminance control area reduced by the timing controller 402. Accordingly, image distortion due to a repetition of the luminance decrease of the output image by the timing controller 402 and the luminance decrease of the input image by the image processing device 22 may be prevented.

In an embodiment (CASE4), the image processing device 22 may calculate the area luminance decrease rate for the luminance control area as the reference area luminance decrease rate for the luminance control area. In other words, the image processing device 22 may adjust the area luminance decrease rate for the luminance control area without considering the luminance decrease rate LDR for the compensation area CA of the timing controller 402. In the embodiment (CASE4), the area luminance decrease rates for the first to sixth luminance control areas LCA1 to LCA6 may be 25, 28, 25, 32, 25, and 25, respectively. According to the embodiment (CASE4), the image processing device 22 may reduce the luminance of the input image for the luminance control area without considering the luminance of the output image for the luminance control area reduced by the timing controller 402. When image distortion does not occur although the luminance decrease of the output image by the timing controller 402 and the luminance decrease of the input image by the image processing device 22 are repeated, the luminance of the input image may be adjusted according to the embodiment (CASE4).

The image processing device 22 may generate the input image data IMG2 by applying the area luminance decrease rate for the luminance control area to the original image data IMG1. The timing controller 402 may generate the output image data IMG3 by applying the luminance decrease rate LDR for the compensation area CA to the input image data IMG2, and the image processing device 22 may generate the input image data IMG2 by applying the luminance decrease rate LDR for the compensation area CA generated by the timing controller 402 to the original image data IMG1. Therefore, the image processing device 22 may adjust the luminance of the input image in consideration of the luminance adjustment for the output image of the timing controller 402, and accordingly, image distortion due to luminance decrease of the compensation area CA may be prevented.

Figure 13:
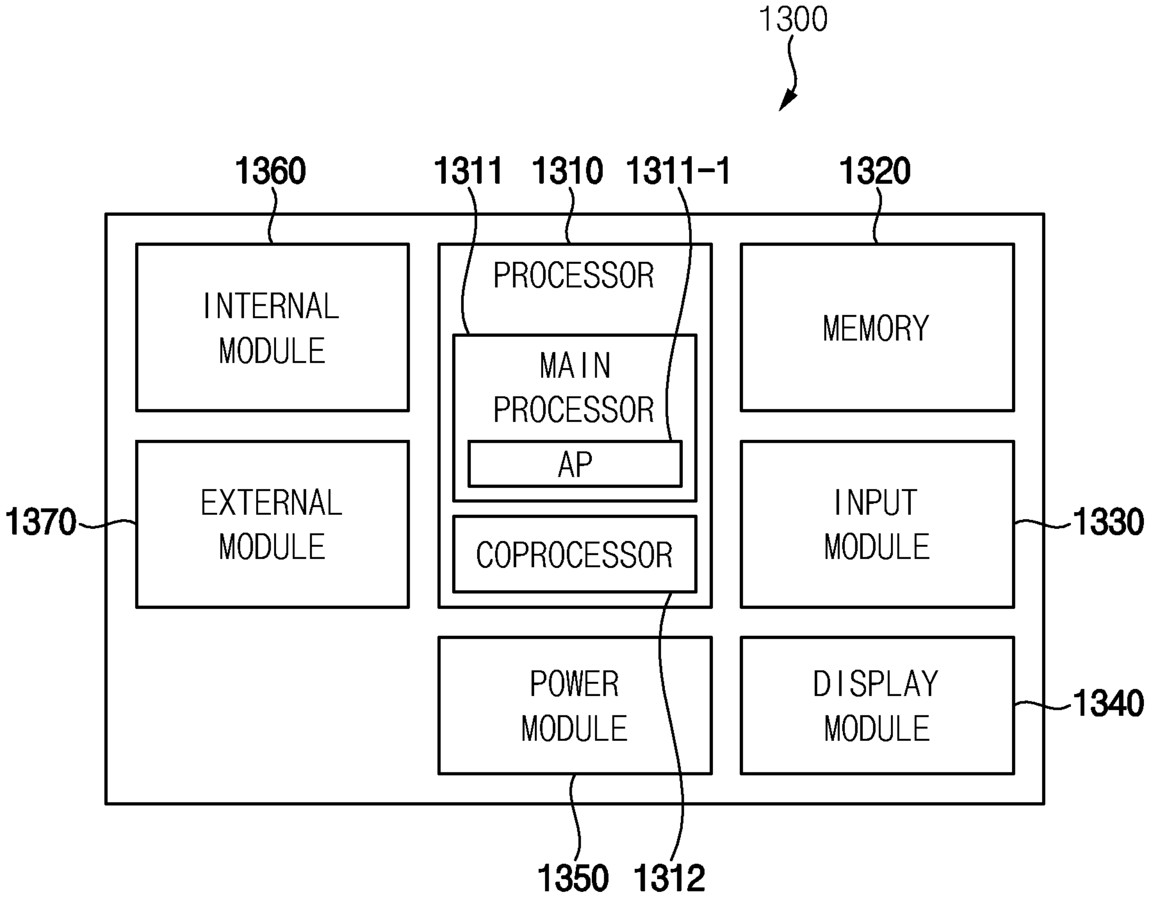
FIG. 13 is a diagram illustrating an electronic apparatus according to an embodiment.

FIG. 13 is a diagram illustrating an electronic apparatus 1300 according to an embodiment.

Referring to FIG. 13, an electronic apparatus 1300 may include a processor 1310, a memory 1320, an input module 1330, a display module 1340, a power module 1350, an internal module 1360, and an external module 1370. In an embodiment, in the electronic apparatus 1300, at least one of the above components may be omitted, or one or more other components may be added.

The processor 1310 may execute software to control at least one other component of the electronic apparatus 1300 connected to the processor 1310, and may perform various data processing or calculation. In an embodiment, as at least part of the data processing or calculation, the processor 1310 may store instructions or data received from other components in the memory 1320, may process the instructions or data stored in the memory 1320, and resulting data may be stored in the memory 1320.

The processor 1310 may include a main processor 1311 and a coprocessor 1312. The main processor 1311 may include an application processor 1311-1. The application processor 1311-1 may correspond to the image processing device 20 in FIG. 1 and the image processing device 22 in FIG. 10. The main processor 1311 may further include at least one of a graphic processing unit ("GPU"), a communication processor ("CP"), and an image signal processor ("ISP").

The coprocessor 1312 may include a controller. The controller may include an interface conversion circuit and a timing control circuit. The coprocessor 1312 may further include a data conversion circuit, a gamma correction circuit, a rendering circuit, or the like.

The memory 1320 may store various data used by at least one component of the electronic apparatus 1300 and input data or output data for commands related thereto. The memory 1320 may include at least one of volatile memory and non-volatile memory.

The input module 1330 may receive a command or data to be used by components of the electronic apparatus 1300 from the outside of the electronic apparatus 1300 (e.g., a user or an external electronic apparatus). The input module 1330 may include a microphone, a mouse, a keyboard, a key (e.g., button), a pen (e.g., passive pen or active pen), or the like.

The display module 1340 may provide visual information to the user. The display module 1340 may correspond to the display device 10 in FIG. 1 and the display device 12 in FIG. 10.

The power module 1350 may supply power to components of the electronic apparatus 1300. The power module 1350 may include a battery that charges power voltage. The internal module 1360 may include a sensor module, an antenna module, a sound output module, or the like. The external module 1370 may include a camera module, a light module, a communication module, or the like. The input module 1330, the sensor module, the camera module, etc. may be used to control the operation of the display module 1340 in conjunction with the processor 1310.

Some of the above components may be connected to each other through a communication method between peripheral devices, for example, a bus, a GPIO (general purpose input/output), an SPI (serial peripheral interface), a MIPI (mobile industry processor interface), or an UPI (ultra path interconnect), and may mutually exchange signals (e.g., commands or data). The processor 1310 may communicate with the display module 1340 through a pre-determined interface, and may use any one of the communication methods described above.

The display device according to the embodiments may be applied to a display device included in a computer, a notebook, a mobile phone, a smart phone, a smart pad, a PMP, a PDA, an MP3 player, or the like.

Although the electronic apparatuses, the display devices, and the methods of driving the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device, comprising:

a display panel which includes a compensation area of a display area;

an image processing device;

a timing controller which receives input image data corresponding to an input image and block luminance decrease rates for a plurality of blocks included in the display area of the input image from the image processing device, the timing controller including:

an average luminance decrease rate calculator which is configured to calculate an average luminance decrease rate of the input image for the compensation area based on the block luminance decrease rates for the plurality of blocks, a luminance decrease rate calculator which is configured to calculate a luminance decrease rate for the compensation area based on at least one of the average luminance decrease rate of the input image for the compensation area and a reference luminance decrease rate for the compensation area, and a data compensator which is configured to generate output image data by applying the luminance decrease rate for the compensation area to the input image data; and a data driver which is configured to provide data voltages generated based on the output image data to the display panel.

2. The display device of claim 1, wherein the luminance decrease rate for the compensation area is zero when the average luminance decrease rate of the input image for the compensation area is greater than 0%.

3. The display device of claim 1, wherein the luminance decrease rate for the compensation area is a fixed value when the average luminance decrease rate of the input image for the compensation area is greater than 0%.

4. The display device of claim 1, wherein the luminance decrease rate for the compensation area is a value obtained by subtracting a value obtained by multiplying the reference luminance decrease rate for the compensation area by the average luminance decrease rate of the input image for the compensation area from the reference luminance decrease rate for the compensation area.

5. The display device of claim 1, wherein the luminance decrease rate for the compensation area is the reference luminance decrease rate for the compensation area.

6. The display device of claim 1, wherein the average luminance decrease rate of the input image for the compensation area is an average value of block luminance decrease rates for blocks corresponding to the compensation area among the plurality of blocks.

7. The display device of claim 1, wherein the timing controller further including:

a block map converter which is configured to convert the input image from a first block map in which the display area includes n block columns and m block rows to a second block map in which the display area includes N block columns and M block rows, wherein each of n and m is a natural number greater than 1, wherein N is a natural number different from n and greater than 1, and wherein M is a natural number different from m and greater than 1.

8. The display device of claim 1, wherein the input image data is generated by applying the block luminance decrease rates for the plurality of blocks to original image data.

9. A method of driving a display device including a display panel which includes a compensation area of a display area:

calculating an average luminance decrease rate of an input image for the compensation area based on block luminance decrease rates for a plurality of blocks included in the display area of the input image received from an image processing device;

calculating a luminance decrease rate for the compensation area based on at least one of the average luminance decrease rate of the input image for the compensation area and a reference luminance decrease rate for the compensation area; and generating output image data by applying the luminance decrease rate for the compensation area to input image data received from the image processing device.

10. The method of claim 9, wherein the luminance decrease rate for the compensation area is zero when the average luminance decrease rate of the input image for the compensation area is greater than 0%.

11. The method of claim 9, wherein the luminance decrease rate for the compensation area is a fixed value when the average luminance decrease rate of the input image for the compensation area is greater than 0%.

12. The method of claim 9, wherein the luminance decrease rate for the compensation area is a value obtained by subtracting a value obtained by multiplying the reference luminance decrease rate for the compensation area by the average luminance decrease rate of the input image for the compensation area from the reference luminance decrease rate for the compensation area.

13. The method of claim 9, wherein the luminance decrease rate for the compensation area is the reference luminance decrease rate for the compensation area.

14. The method of claim 9, wherein the average luminance decrease rate of the input image for the compensation area is an average value of block luminance decrease rates for blocks corresponding to the compensation area among the plurality of blocks.

15. The method of claim 9, further comprising:

converting the input image from a first block map in which the display area includes n block columns and m block rows to a second block map in which the display area includes N block columns and M block rows before calculating the average luminance decrease rate of the input image for the compensation area, wherein each of n and m is a natural number greater than 1, wherein N is a natural number different from n and greater than 1, and wherein M is a natural number different from m and greater than 1.

16. An electronic apparatus, comprising:

an image processing device which generates input image data corresponding to an input image and block luminance decrease rates for a plurality of blocks included in a display area of the input image; and a display device which displays an image based on data voltages, wherein the display device includes:

a display panel which includes a compensation area of the display area;

a timing controller which receives the input image data and block luminance decrease rates for the plurality of blocks from the image processing device, the timing controller including:

an average luminance decrease rate calculator which is configured to calculate an average luminance decrease rate of the input image for the compensation area based on the block luminance decrease rates for the plurality of blocks, a luminance decrease rate calculator which is configured to calculate a luminance decrease rate for the compensation area based on at least one of the average luminance decrease rate of the input image for the compensation area and a reference luminance decrease rate for the compensation area, and a data compensator which is configured to generate output image data by applying the luminance decrease rate for the compensation area to the input image data; and a data driver which is configured to provide the data voltages generated based on the output image data to the display panel.

17. The electronic apparatus of claim 16, wherein the luminance decrease rate for the compensation area is zero or a fixed value when the average luminance decrease rate of the input image for the compensation area is greater than 0%.

18. The electronic apparatus of claim 16, wherein the luminance decrease rate for the compensation area is a value obtained by subtracting a value obtained by multiplying the reference luminance decrease rate for the compensation area by the average luminance decrease rate of the input image for the compensation area from the reference luminance decrease rate for the compensation area.

19. The electronic apparatus of claim 16, wherein the average luminance decrease rate of the input image for the compensation area is an average value of block luminance decrease rates for blocks corresponding to the compensation area among the plurality of blocks.

20. The electronic apparatus of claim 16, wherein the image processing device generates the input image data by applying the block luminance decrease rates for the plurality of blocks to original image data.

* * * * *